United States Patent [19]

Min

[11] Patent Number: 4,801,858
[45] Date of Patent: Jan. 31, 1989

[54] MOTOR STARTING CIRCUIT

[75] Inventor: Young K. Min, Milwaukee, Wis.

[73] Assignee: PT Components, Inc., Indianapolis, Ind.

[21] Appl. No.: 81,347

[22] Filed: Aug. 4, 1987

Related U.S. Application Data

[63] Continuation of Ser. No. 634,699, Jul. 26, 1984, abandoned.

[51] Int. Cl.⁴ .............................................. H02P 1/28
[52] U.S. Cl. ...................................... 318/786; 318/779
[58] Field of Search ............... 318/786, 778, 779, 809; 323/901, 300, 238; 307/647

[56] References Cited

U.S. PATENT DOCUMENTS

| | | | |
|---|---|---|---|
| 3,363,143 | 1/1968 | Cavanaugh | 323/238 |
| 3,367,237 | 6/1972 | Hubel et al. | 318/778 |
| 3,389,315 | 6/1968 | Andreas et al. | 318/779 |
| 3,487,345 | 12/1969 | Watrous et al. | 335/146 |
| 3,859,591 | 1/1975 | Saunders | |
| 3,879,652 | 4/1975 | Billings | 307/647 |
| 3,950,657 | 4/1976 | Sheng et al. | |
| 4,072,880 | 2/1978 | Oshima et al. | 318/778 |
| 4,328,459 | 5/1982 | McLeod, Jr. | 323/300 |
| 4,366,426 | 12/1982 | Turles | 318/286 |
| 4,399,394 | 8/1983 | Ballman | 318/786 |
| 4,459,532 | 7/1984 | Schutten et al. | 318/808 |
| 4,459,535 | 7/1984 | Schutten et al. | 318/808 |

Primary Examiner—David Smith, Jr.
Attorney, Agent, or Firm—Robert A. Brown; Jacque L. Meister

[57] ABSTRACT

A solid state starting and control circuit for AC motors employing a single phase power source is disclosed in which the normal motor starting capacitor and speed responsive switch or similar means for energizing and deenergizing the start winding are eliminated by use of an all electronic, sparkless circuit which provides phase displaced current to excite the motor starting winding and in which there is time regulated gradual decreasing of the starting current pulse width to deenergize the start winding.

10 Claims, 3 Drawing Sheets

MOTOR STARTING CIRCUIT

This is a continuation division, of application Ser. No. 634,699, filed July 26, 1984, now abandoned.

This invention relates generally to any single phase AC motors and more particularly to capacitor start AC motors and electronic motor starting circuit means therefor.

In general, single phase AC motors employ a start winding and a main running winding. The current in the start winding is phase shifted relative to the main winding current in order to provide starting torque during the normal motor start up periods; the start winding usually being deenergized prior to the motor reaching operating speed. In normal course, deenergization of the start windings is carried out by speed responsive switch or timed means, such as a centrifugal switch and actuator or electromagnetic switch, operable at a preselected motor speed, to deenergize the start winding circuit. Employment of such an actuator-switch generates typical disadvantages such as corrosion, adjustment or breakage of mechanical parts, sparking, contact wear, etc. In other instances electronic switching ciruits have been substituted for the speed responsive switch means. However, due to relative high cost such developments have encountered limited acceptance and use.

In addition to the speed responsive switch means noted above, the typical single phase AC motor also employs an AC starting capacitor which is relatively cumbersome, and is limited in its cyclic capability of energizing the start winding.

BRIEF SUMMARY OF THE INVENTION

The present invention is directed to novel electronic circuit means for starting single phase powered AC motors which avoids the above noted difficulties attendant to the use of AC starting capacitors and speed responsive switch means by eliminating such elements in the motor starting means of this invention.

In brief this invention comprises all electronic, sparkless, starting and control circuitry for single phase powered AC motors wherein phase displacement current is provided to excite the motor start windings. Uniquely the pulse width of such starting current signals is gradually reduced to zero to deenergize the start winding. To accomplish this the basic circuitry of this invention includes a single phase AC power source, the main motor windings, first rectifier means for producing a series of rectified pulses from the sinusoidal AC input, zero crossing detector means for detecting and providing an output signal each time the sinusoidal AC wave form goes through zero, and integrated signal manager means for accepting the output of the zero crossing detector along with other signals, conditioning the signal information and providing an output pulse rate to electronic switch means which cooperate with second rectifier means to control energization of the start windings of the motor. Timing circuit means operate in conjunction with the signal manager to condition the output signals of the latter to progressively decreasing pulse width or time duration whereby to bring about the ultimate deenergization of the motor start winding. The two rectifier means are arranged to provide a compact dual power supply, which eliminates the need for a cumbersome line isolation transformer or the like while presenting low current power for the logic circuitry and high current power to the motor start winding.

A principle object of this invention is to provide a novel all electronic starting circuit for AC motors utilizing a single phase power source.

Another important object of this invention is to provide a single phase AC motor starting circuit as aforesaid which is sparkless and safe to operate in potentially hazardous atmospheres.

Another object of this invention is to provide a phase displaced current in the starting windings of a single phase AC motor without the use of an AC start capacitor.

Still another object of the invention is to provide means for interrupting starting current in single phase powered AC motor start windings without the use of mechanical or other speed responsive switch means.

A further object of this invention is to provide means for exciting the start winding of a single phase powered AC motor for a controlled time period.

Still another important object of this invention is to provide a novel bridge rectifier power supply arrangement capable of providing high and low current without the use of isolation transformers.

A further important object of this invention is to provide an electronic starting circuit for AC motors embodying timing means for continuously reducing the time interval for start winding excitation and operable to reduce magnetic noise when the start winding is deenergized.

Still another important object of the invention is to provide improved starting and control circuit means for single phase AC motors which is compact, substantially maintenance free and lends itself to economies of production.

Having described this invention the above and further objects, features and advantages thereof will appear from time to time from the following description of a preferred embodiment thereof illustrated in the accompanying drawings and representing the best mode presently contemplated for enabling those with skill in the art to practice this invention.

DESCRIPTION OF THE PREFERRED EMBODIMENT

Figure 1:
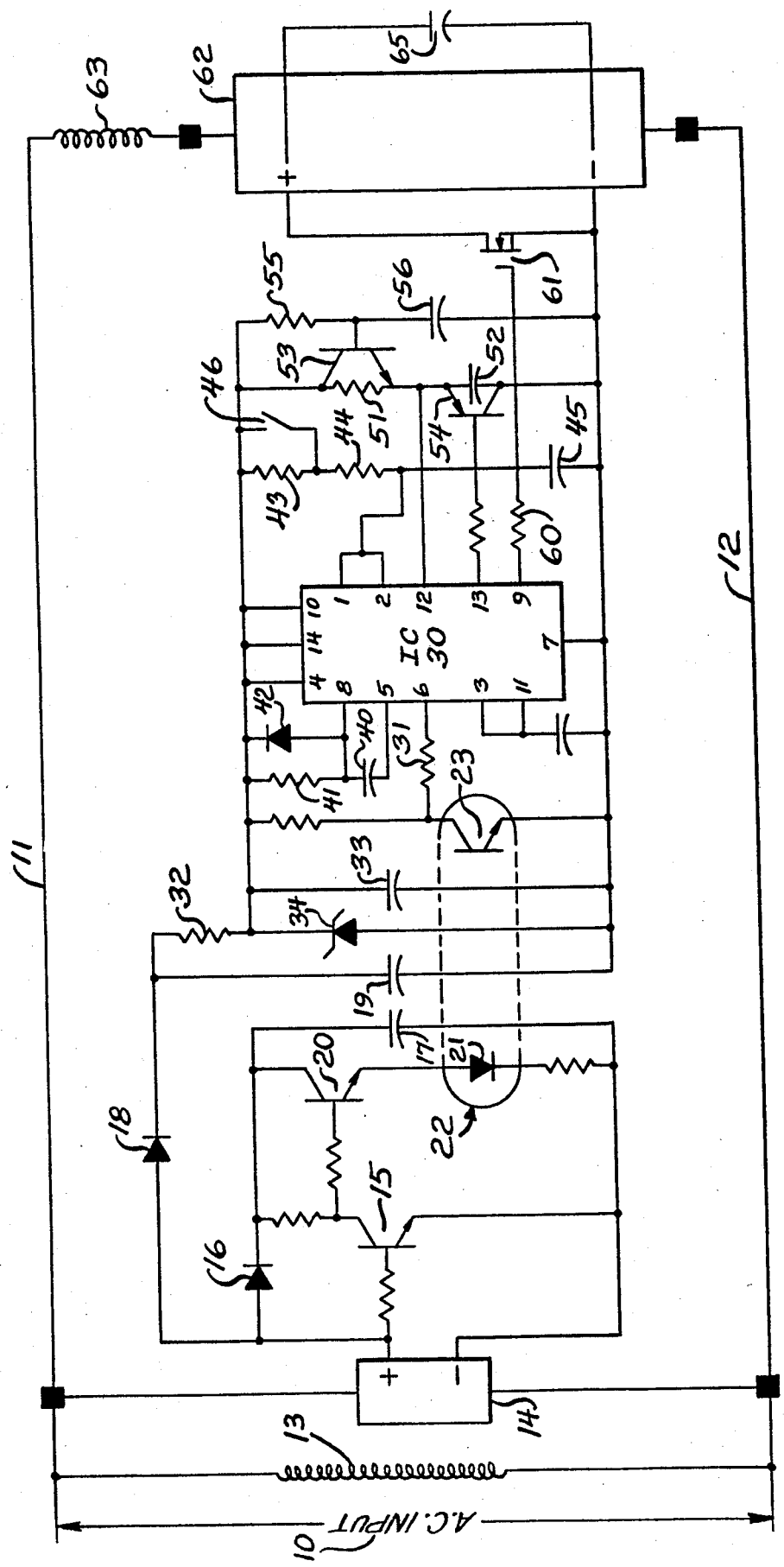
FIG. 1 is a schematic circuit diagram of the basic motor starting and control circuit of this invention.
Figure 2:
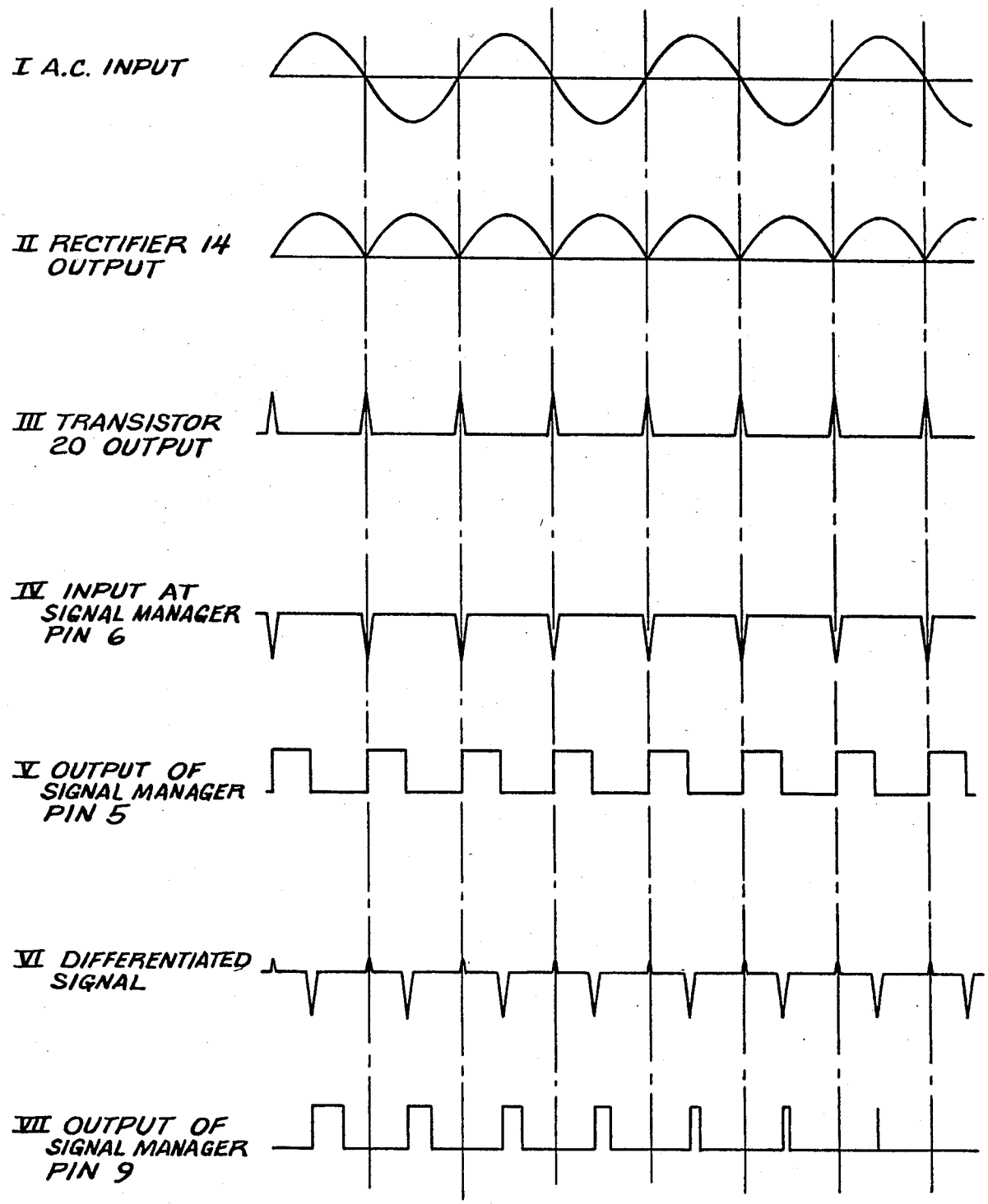
FIG. 2 is a chart showing electrical wave forms at various points in the circuit of FIG. 1.

Turning now to the detail features of the preferred embodiment shown in the drawings, illustrative of the basic features of the motor starting circuit means according to this invention, reference is made to FIGS. 1 and 2.

As shown in FIG. 1, an AC voltage source 10, typically 115/230 volts 60 Hertz, is coupled between main conductors 11 and 12. This AC power input is applied to the motor's running or main winding 13 and to a first full wave bridge rectifier 14, constituting a diode rectifier, coupled in parallel circuit with windings 13.

As shown in FIG. 2 of the drawings the uppermost wave form I demonstrates that the AC input to rectifier 14 is a sinusoidal wave while the output from rectifier 14, indicated by wave form II, comprises a series of full wave rectified pulses.

The rectified pulses developed by bridge rectifier 14 are applied simultaneously to the base circuit of transistor 15, and to diode 16 to charge a capacitor 17 with DC voltage. Such rectified pulses also are applied to diode 18 to charge a second capacitor 19 to a DC level.

Transistor 15 is in circuit with a second transistor 20 and diode section 21 of an optocoupler 22. Components 15, 20 & 22 serve as a zero crossing detector for determining each time the sinusoidal wave form of the AC power input goes through a zero crossing point. (See wave form I of FIG. 2). Transistor 15 is a NPN type and turns on only in response to positive signals. Therefore the positive output from bridge rectifier 14 switches transistor 15 to an "on" state which in turn drives transistor 20 each time the sinusoidal wave form I in FIG. 2 goes through a zero crossing point. Conduction of transistor 20 serves to energize the diode section 21 of optocoupler 22 causing the same to conduct each time a zero crossing occurs. Conduction of the diode section 21 causes the conduction of transistor portion 23 thereof. The output of transistor 20 to the diode portion 21 of optocoupler 22 constitutes a series of positive spike pulses (wave form III of FIG. 2) with each positive pulse occuring as the input sinusoidal wave form goes through its zero crossing point.

Each time the transistor portion 23 of the optocoupler 21 conducts, the input to trigger signal pin 6 of an integrated circuit signal manager 30, goes "low" and is clamped to reference ground via resistor 31 to produce a resulting wave form constituting a series of negative pulses which occur in synchronism with the zero crossing of the input sine wave, as illustrated by wave form IV in FIG. 2.

Signal manager 30 comprises an integrated microcircuit which serves to manage and condition the signal input and output therefrom by accepting multiple signals, conditioning the received signal information and providing an output signal pulse rate requisite to start and accelerate the single phase motor, as will appear in greater detail presently. Dual timing integrated circuits, generally identified under industry standard No. 555-556, capable of providing the functions of signal manager 30 are commercially available from many manufacturers.

A low current power supply for the integrated circuit of signal manager 30 is provided by the diode 18, resistance 32, capacitor 33 and a zener diode 34 network; the zener diode 34 serving to provide a regulated voltage. In addition to its signal management functions, the integrated circuit 30 also importantly serves as a timing device in conjunction with related timing circuit networks as will be described more fully hereinafter; the major thrust of which is to phase out or regulate the output of the integrated circuit 30 to accordingly deactivate the start winding of the motor. Thus in accordance with that objective of this invention the start period for the motor is time controlled.

On reception of input trigger signals at pin 6, the integrated signal manager 30 develops a series of positive output pulses at pin 5 (see wave form V of FIG. 2) which feed a differentiator network comprising capacitor 40, resistor 41 and diode 42. The capacitor 40 and resistor 41 serve to differentiate the positive output signal from pin 5, with the positive portion of the differentiated wave form VI of FIG. 2 being clamped to reference ground level by diode 42 and the negative portion of such signal being fed to pin 8 for purposes of triggering the time at which drive signals at output pin 9 commence or "start" as will be described presently.

The pulse width or time duration of the output signals from pin 5 is controlled by a network comprising series related resistors 43, 44 and capacitor 45. It also is to be noted that resistor 43 is in parallel with a direction switch means 46 which is normally closed to bypass or short out resistor 43 providing a first predetermined time constant for the output pulses of pin 5 over resistor 44 and capacitor 45. In operation the resistor capacitor network 44, 45 controls the length of time for pin 5 to be positive by regulating the input to pins 1 and 2 of the signal manager. When capacitor 45 reaches a threshold voltage dictated by pin 2 it discharges into pin 1 causing the output at pin 5 of the signal manager 30 to go "low". Opening of switch 46 places resistor 43 in the circuit causing a longer time constant that increases the width of pin 5 signals. The width of the pin 5 signals is sufficient to shift over into a phase of opposite polarity. Thus, the signals received by pin 9 occur during the time of opposite polarity to start the motor in a reverse direction, if desired.

Inasmuch as the integrated circuit 30 not only conditions the signal information, but provides a regulated pulse output rate for the starting and acceleration of the single phase motor and more particularly for controlling energization and deenergization of the start windings thereof, it is essential that certain timing functions be performed. This is accomplished by means of two additional time constant networks which control the input to threshold voltage pin 12 of the signal manager 30.

The first time constant is determined by the series resistance capacitor network 51, 52 parallel by transistors 53, 54, respectively, which cooperate to regulate the pulse width or duration of the input signals to pin 12.

The second time constant is provided by the series resistor-capacitor network 55, 56 paralleling the first time constant network. This second time constant functionally prevents application of starting current to the single phase AC motor start winding, when capacitor 56 is fully charged.

Regarding the first time constant, the charge across capacitor 56 begins to increase as soon as DC voltage is available from the regulated poewr supply provided by diode 18, capacitor 19, resistor 32, capacitor 33, and zener diode 34. As the positive charge across capacitor 56 builds up transistor 53 begins to conduct. As a consequence the reistance of parallel resistor 51 is modified effecting a decrease in the first time constant network.

When the charge across capacitor 52 reaches a threshold level established within IC30 for firing it causes transistor 54 to conduct which thereby discharges capacitor 52. This action resets the signal manager 30 for the next incoming zero crossing signal thereby regulating the pulse width of the output signal from IC30 pin 9 which is continuously reducing toward zero as shown by wave form VII of FIG. 2. The time for this pulse width to approach zero is dependent upon the second time consultant of resistance 55 and capacitor 56.

When capacitor 56 is fully charged transistor 53 is driven into saturation, causing its parallel resistor 51 to react as if it were a short circuit. At this time the pulse width of the output signal at pin 9 is so small as to effect deenergization of the motor's start windings.

It will be recalled that the output drive signals at pin 9 of the signal manager are triggered by the differentiated start signals from pin 5 by virtue of the differentiator network 40, 41. Such output drive signals are fed over resistor 60 to electronic switch means 61 comprising a power MOSFET which is connected across the plus and minus terminals of a second full wave bridge rectifier 62 to operably switch the load (in this instance the motor starting winding 63) "on" and "off" for the controlled starting cycle. Inasmuch as the output signal from pin 5 gradually approaches zero pulse width as heretofore noted, so do the MOSFET driving signals from pin 9. Thus the starting pulse to start winding 63 also gradually decreases to nearly zero, deenergizing the start winding according to that objective of this invention.

It will be noted in FIG. 1, that the MOSFET 61 is paralleled by a capacitor 65 across the plus and minus terminals of the second bridge rectifier 62. This capacitor serves to reduce transients generated when current in the start winding 63 is interrupted. It also aids the phase displacement of the current through winding 63 to increase the level of starting torque during the period when such starting current is active.

Figure 3:
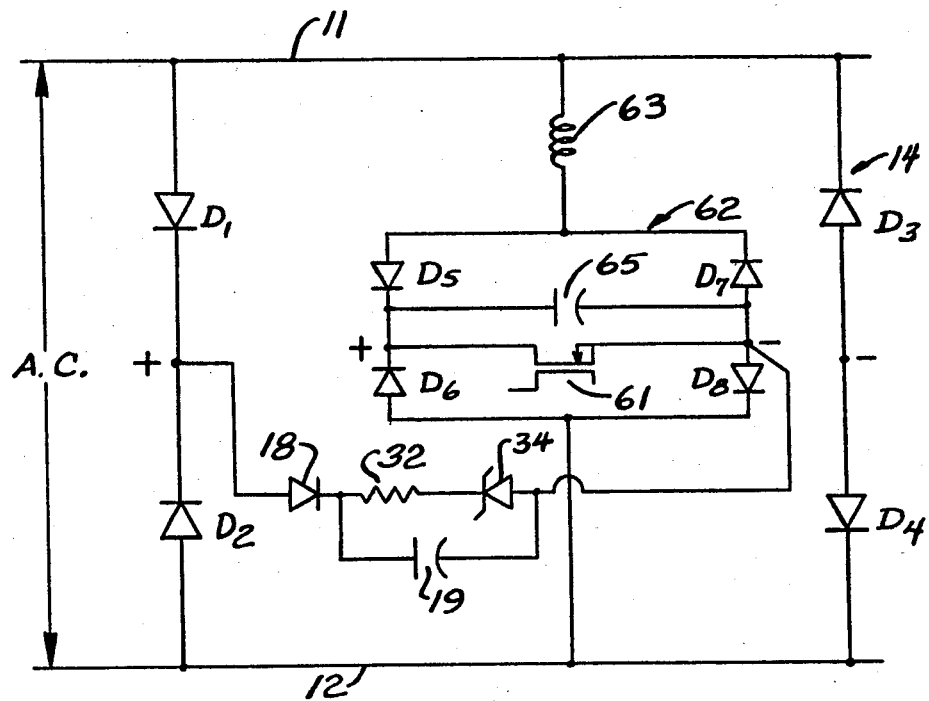
FIG. 3 is a schematic diagram illustrating the dual power supply incorporated in the starting and control circuit of FIG. 1.

As noted heretofore one of the more important objectives of this invention is the provision of a compact and dependable dual power supply for providing low current power to the logic circuits and high current power to the motor start winding 63 without the need for isolation transformers. This is accomplished by the novel arrangement of the two full wave bridge rectifiers 14 and 62 as illustrated in FIG. 3.

As there shown, bridge rectifier 14 comprises four diodes D1-D4 and bridge rectifier 62 comprises four diodes D5-D8. The supply for powering IC30 (not shown) is taken from the postiive side of rectifier 14 over diode 18, resistance 32, and zener diode 34 to the negative side of bridge rectifier 62. This arrangement provides positive voltage from bridge rectifier 14 with respect to the negative reference of bridge rectifier 62. At the same time bridge rectifier 62 is connected in series with the motor start winding 63 and across the supply lines 11 and 12 to provide high current drive pulses to start winding 63 in response to the time regulated switching activity of the MOSFET 61. Uniquely, in accordance with this invention the time duration of such driving pulses is gradually reduced to effect deenergization of the start windings.

From the forgoing it is believed that those skilled in the art will readily recognize the novel advancement of the present invention over prior known motor starting means, and will appreciate that while this invention has been described in conjunction with a particular preferred embodiment thereof illustrated in the drawing, the same is susceptible to variations and substitution of equivalents without departing from the spirit and scope of the invention which is to be unlimited by the foregoing except as may appear in the hereafter appended claims.

I claim:

1. A starting control circuit for AC single phase motors having both running and starting windings each connectable to an AC power source, comprising: an AC power source switchably connected to said running windings of said motor and to said starting control circuit, first full wave bridge rectifier means connected to said AC power source in parallel with said running windings, DC power source means connected at its input to the positive side of said first full wave bridge rectifier means, zero voltage inflection point detecting means connected to said first full wave bridge rectifier means and to said AC power source for providing signals indicative of said zero voltage inflection points, control pulse generating means connected to said DC power source means and responsive to the signal output of said zero voltage inflection point detecting means and adapted to provide control pulses selectively phase shifted from said zero voltage inflection points, and switching means connected to said starting windings of said motor and connected and responsive to said control pulses to switch said starting winding on and off each cycle of said AC power source for a time interval equal to each control pulses duration and off therebetween to thereby effect motor starting.

2. A starting control circuit for AC single phase motors having both running and starting windings each connectable to an AC power source, comprising:
   an AC power source switchably connected to said running windings of said motor and to said starting control circuit,
   first full wave bridge rectifier means connected to said AC power source in parallel with said running windings,
   zero voltage inflection point detecting means connected to said first full wave bridge rectifier means and to said AC power source for providing signals indicative of said zero voltage inflection points, said zero voltage inflection point detecting means comprising:
      first transistor means connected at its input to the positive output of said first full wave bridge rectifier means and responsive to each positive going output excursion thereof to turn on,
      first and second series diode and capacitor means connected at said diodes inputs to the positive output of said first bridge rectifier means to effect charging of the capacitor associated with each diode, and
      second transistor means connected at its input to the output of said first transistor means and in parallel to the capacitor of said first series diode and capacitor means to generate spiked pulses, one for each turn on of said first transistor means,
   control pulse generating means connected to said DC power source means and responsive to the signal output of said zero voltage inflection point detecting means and adapted to provide control pulses selectively phase shifted from said zero voltage inflection points, and switching means connected to said starting windings of said motor and connected and responsive to said control pulses to switch said starting winding on and off each cycle of said AC power source for a time interval equal to each control pulses duration and off therebetween to thereby effect motor starting.

3. A starting control circuit for AC single phase motors having both running and starting windings each connectable to an AC power source, comprising:
   an AC power source switchably connected to said running windings of said motor and to said starting control circuit,
   first full wave bridge rectifier means connected to said AC power source in parallel with said running windings,
   DC power source means connected at its input to the positive side of said first full wave bridge rectifier means,
   zero voltage inflection point deflecting means connected to said first full wave ridge rectifier means and to said AC power source for providing signals indicative of said zero voltage inflection points, control pulse generating means connected to said DC power source means and responsive to the signal output of said zero voltage inflection point detecting means and adapted to provide control pulses selectively phase shifted from said zero voltage inflection points, said control pulse generating means including phase shifting means, comprising:

signal magager means connected and responsive to said voltage inflection point signals to generate positive going output pulses, one for each inflection point signal, RC time delay means comprising first resistor means and capacitor means connected at its input to said DC power source means and at its output to said signal manager means to control the maximum duration of said positive going output pulses, differentiator means connected at its input to said positive going output pulses to generate a phase shifted negative going trigger signal for said signal manager means based on the duration of said positive going output pulses, and said control pulse generator means within said signal manager means being responsive to said phase shifted pulse, one for each trigger signal, and switching means connected to said starting windings of said motor and connected and responsive to said control pulses to switch said starting winding on and off each cycle of said AC power source for a time interval equal to each control pulses duration and off therebetween to thereby effect motor starting.

4. A starting control circuit for AC single phase motors in accord with claim 3 wherein said control pulse generator means further comprises:

first series RC time constant network means connected at its input to said DC power source means to regulate control pulse duration, second series RC time constant network means connected at its input to said DC power source means and in parallel to said first series RC time constant network, first transistor means coupling said first series RC time constant network means to said second series RC time constant network means to decrease the time constant of said second network as the capacitor of said first RC time constant network means increases in charge, second transistor means coupling said second series RC time constant network to said signal manager means to discharge the capacitor of said second series RC time constant network and reset said signal manager means to thereby regulate the duration of each of said phase shifted control pulses.

5. A starting control circuit for AC single phase motors in accord with claim 2 wherein said switching means comprises:

second full wave bridge rectifier means connected in series with said starting windings and said series is connected across said AC power source, pulsed switching means connected at its input to said signal manager means and across said second full wave bridge rectifier means and responsive to said phase shifted control pulses to effect on and off switching of said starting windings for the duration of each control pulse.

6. A starting control circuit for AC single phase motors in accord with claim 2 wherein said DC power source means comprises diode means connected at its input to the positive side of said first full wave rectifier means and at its output in series with resistor means and zener diode means, said zener diode means connected in parallel with capacitor means.

7. A starting control circuit for AC single phase motors in accord with claim 3 wherein said signal manager means comprises an integrated circuit conforming to industry standard 555–556.

8. A starting control circuit for AC single phase motors in accord with claim 3 wherein said first and said second full wave bridge rectifier means each comprises diode means.

9. A starting control circuit for AC single phase motors in accord with claim 3 wherein said phase shift of said control pulses is substantially 90 degrees.

10. A starting control circuit for AC single phase motors in accord with claim 3 further comprising means for reversing motor direction on start-up comprising:

second resistor means connected to said DC power source network, and switching means for connecting said second resistor means in series with the capacitor means of said RC time delay means in substitution for said first resistor means to increase the duration of said positive going output pulses and thereby the phase shft of said control pulses to a point where start-up is in the opposite direction from that achieved with said first resistor means.

* * * * *